(12) United States Patent
Quarles et al.

(10) Patent No.: US 10,692,401 B2
(45) Date of Patent: Jun. 23, 2020

(54) DEVICES AND METHODS FOR INTERACTIVE AUGMENTED REALITY

(71) Applicant: THE BOARD OF REGENTS OF THE UNIVERSITY OF TEXAS SYSTEM, Austin, TX (US)

(72) Inventors: John Quarles, San Antonio, TX (US); Sharif Mohammad Shahnewaz Ferdous, San Antonio, TX (US); Kevin King, San Antonio, TX (US); Mirza Sohail Baig, San Antonio, TX (US); Hector Caraballo, San Antonio, TX (US); Roland Paquette, San Antonio, TX (US)

( * ) Notice: Subject to any disclaimer, the term of this patent is extended or adjusted under 35 U.S.C. 154(b) by 0 days.

(21) Appl. No.: 16/349,345

(22) PCT Filed: Nov. 15, 2017

(86) PCT No.: PCT/US2017/061675
§ 371 (c)(1),
(2) Date: May 13, 2019

(87) PCT Pub. No.: WO2018/093816
PCT Pub. Date: May 24, 2018

(65) Prior Publication Data
US 2019/0347959 A1    Nov. 14, 2019

Related U.S. Application Data

(60) Provisional application No. 62/422,396, filed on Nov. 15, 2016.

(51) Int. Cl.
G09B 23/30 (2006.01)
G02B 27/01 (2006.01)
(Continued)

(52) U.S. Cl.
CPC ......... *G09B 23/30* (2013.01); *G02B 27/0172* (2013.01); *G06F 3/016* (2013.01);
(Continued)

(58) Field of Classification Search
CPC ........ G09B 23/30; G09B 9/00; G06T 19/006; G06T 3/0068; G06F 3/016; G06F 3/147; G02B 27/0172; G09G 2380/08
(Continued)

(56) References Cited

U.S. PATENT DOCUMENTS 8,213,680 B2 * 7/2012 Fitzgibbon ......... G06K 9/00335
348/169
8,469,713 B2    6/2013 Kron et al.
(Continued)

FOREIGN PATENT DOCUMENTS

DE    102014011163    1/1916
DE    102014224851    6/1916
(Continued)

OTHER PUBLICATIONS

PCT International Search Report and Written Opinion issued in International Application No. PCT/US2017/061675, dated Feb. 14, 2018.

*Primary Examiner* — Sae Won Yoon
(74) *Attorney, Agent, or Firm* — Parker Highlander PLLC

(57) ABSTRACT

Systems and methods comprising an augmented reality display device to display a virtual anatomic display registered with a physical anatomic model. In certain embodiments, the virtual anatomic display can be registered with the physical anatomic model by user-selected registration points on the physical model.

11 Claims, 6 Drawing Sheets

(51) Int. Cl.
*G06F 3/01* (2006.01)
*G06T 3/00* (2006.01)
*G06T 19/00* (2011.01)
*G09B 9/00* (2006.01)

(52) U.S. Cl.
CPC .......... *G06T 3/0068* (2013.01); *G06T 19/006* (2013.01); *G09B 9/00* (2013.01)

(58) Field of Classification Search
USPC .......................................................... 345/633
See application file for complete search history.

(56) References Cited

U.S. PATENT DOCUMENTS

| | | | |
|---|---|---|---|
| 8,605,133 | B2 | 12/2013 | Lampotang et al. |
| 8,662,892 | B2 | 3/2014 | Mccormack et al. |
| 8,731,332 | B2 * | 5/2014 | Osako ................ G06T 7/74 382/287 |
| 8,990,682 | B1 | 3/2015 | Wong et al. |
| 9,053,641 | B2 | 6/2015 | Samosky |
| 9,081,177 | B2 | 7/2015 | Wong et al. |
| 9,142,144 | B2 | 9/2015 | Meglan et al. |
| 9,251,721 | B2 | 2/2016 | Lampotang et al. |
| 9,318,032 | B2 | 4/2016 | Samosky et al. |
| 9,341,849 | B2 | 5/2016 | Wong et al. |
| 9,646,201 | B1 * | 5/2017 | Horowitz .......... G06K 9/00389 |
| 2008/0020361 | A1 | 1/2008 | Kron et al. |
| 2010/0055657 | A1 | 3/2010 | Goble et al. |
| 2010/0157018 | A1 | 6/2010 | Lampotang et al. |
| 2010/0159434 | A1 | 6/2010 | Lampotang et al. |
| 2011/0084983 | A1 | 4/2011 | Kent |
| 2011/0095980 | A1 | 4/2011 | Sweetser et al. |
| 2011/0119317 | A1 | 5/2011 | Kazoun et al. |
| 2012/0001937 | A1 | 1/2012 | Tagashira et al. |
| 2012/0038739 | A1 | 2/2012 | Welch et al. |
| 2012/0045742 | A1 | 2/2012 | Meglan et al. |
| 2012/0086729 | A1 * | 4/2012 | Baseley ................ G06T 7/73 345/633 |
| 2012/0102231 | A1 | 4/2012 | Kazoun et al. |
| 2012/0102439 | A1 | 4/2012 | Mitchell et al. |
| 2012/0214594 | A1 | 8/2012 | Kirovski et al. |
| 2012/0313968 | A1 | 12/2012 | Yoshioka |
| 2013/0095452 | A1 | 4/2013 | McCormack et al. |
| 2014/0019080 | A1 | 1/2014 | Chan et al. |
| 2014/0071165 | A1 * | 3/2014 | Tuchschmid .......... G09B 23/30 345/633 |
| 2014/0240349 | A1 | 8/2014 | Tuukkanen |
| 2015/0009214 | A1 * | 1/2015 | Lee ..................... G06T 17/10 345/420 |
| 2015/0015582 | A1 | 1/2015 | Kaiser et al. |
| 2015/0062123 | A1 * | 3/2015 | Yuen ................. G06T 19/006 345/420 |
| 2015/0084990 | A1 * | 3/2015 | Laor .................. G06F 3/011 345/633 |
| 2015/0178967 | A1 * | 6/2015 | Kruglick ............. G06T 11/00 345/625 |
| 2015/0356890 | A1 | 12/2015 | Siassi |
| 2016/0080732 | A1 * | 3/2016 | Pedley ............. G02B 27/0172 345/8 |
| 2016/0203647 | A1 * | 7/2016 | Friesen ................ G06T 11/60 345/633 |
| 2016/0292918 | A1 | 10/2016 | Cummings et al. |

FOREIGN PATENT DOCUMENTS

| | | |
|---|---|---|
| EP | 2587792 A1 | 5/2013 |
| EP | 2587792 A4 | 6/2014 |
| WO | WO 2016/087121 | 6/1916 |
| WO | WO 2012/106706 | 8/2012 |
| WO | WO 2015/027286 | 3/2015 |

* cited by examiner

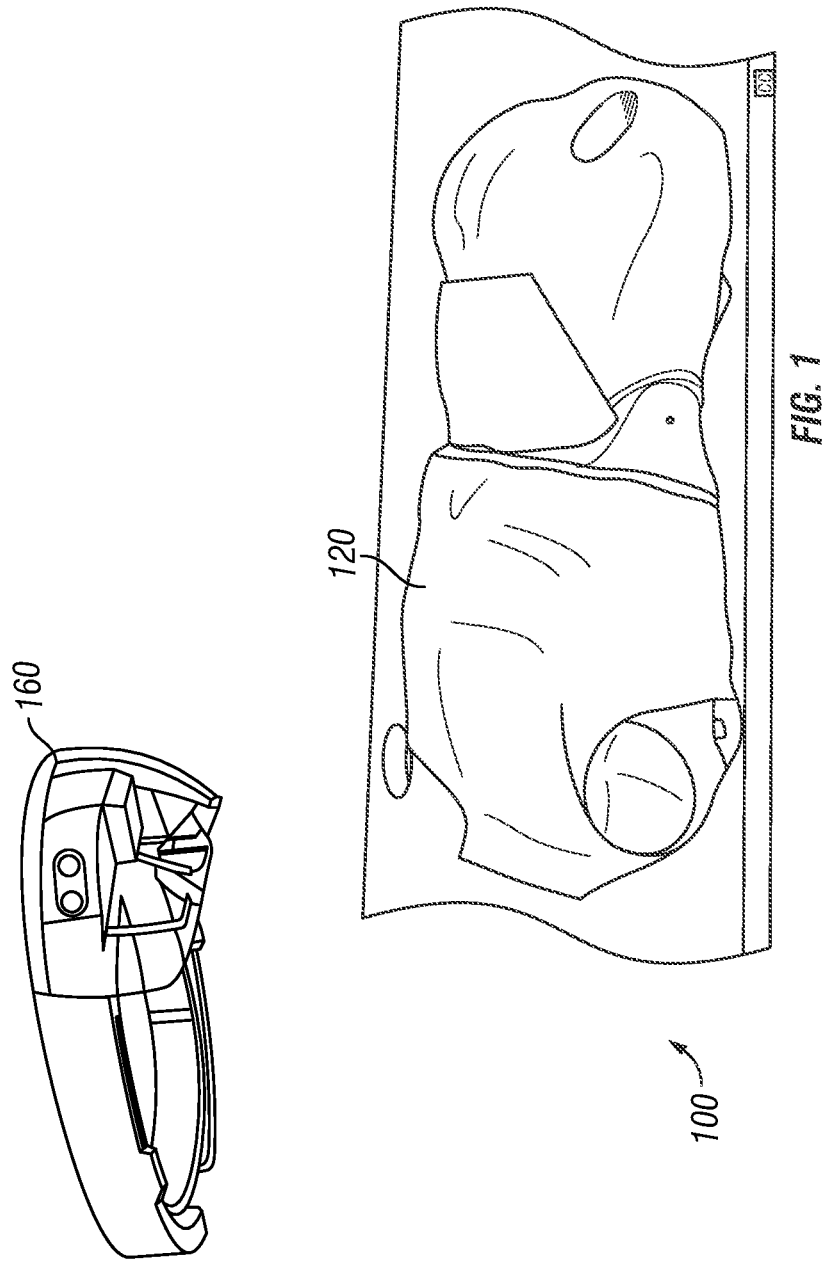

DEVICES AND METHODS FOR INTERACTIVE AUGMENTED REALITY

CROSS-REFERENCE TO RELATED APPLICATIONS

This application is a national phase application under 35 U.S.C. § 371 of International Application No. PCT/US2017/061675, filed Nov. 15, 2017, which claims priority to U.S. Provisional Patent Application Ser. No. 62/422,396 filed Nov. 15, 2016, the entire contents of each disclosure referenced above is incorporated herein by reference.

BACKGROUND INFORMATION

A simulation can be used to provide representations of certain characteristics or behaviors of a particular physical or abstract system. For example, simulations can be used to show the effects of particular courses of action. A physical simulation is a simulation in which physical objects are substituted for a real thing or entity. Physical simulations are often used in interactive simulations involving a human operator for educational and/or training purposes. For example, mannequin patient simulators are used in the healthcare field, flight simulators and driving simulators are used in various industries, and tank simulators may be used in military training.

Physical simulations can provide tactile and haptic feedback for a human operator and a three-dimensional (3-D) interaction perspective suited for learning psycho-motor and spatial skills.

For example, in the health care industry, medical simulators are used to teach therapeutic and diagnostic procedures, medical concepts, and decision making skills. Many medical simulators involve a computer or processor connected to a physical representation of a patient, also referred to as a mannequin patient simulator (MPS). These MPSs have been widely adopted and consist of an instrumented anatomical model that can sense certain interventions and, via mathematical models of physiology and pharmacology, the model reacts appropriately in real time.

For example, upon sensing an intervention such as administration of a drug, the model can react by producing an increased palpable pulse at the radial and carotid arteries and displaying an increased heart rate on a physiological monitor. In certain cases, real medical instruments and devices can be used with the life-size MPSs and proper technique and mechanics can be learned.

Physical simulations or objects are limited by the viewpoint of the user. In particular, physical objects such as anesthesia machines (in a medical simulation) and car engines (in a vehicle simulation) and physical simulators such as MPSs (in a medical simulation) remain a black-box to learners in the sense that the internal structure, functions and processes that connect the input (cause) to the output (effect) are not made explicit. Unlike a user's point of reference in an aircraft simulator where the user is inside looking out, the user's point of reference in, for example, a mannequin patient simulator is from the outside looking in any direction at any object, but not from within the object. In addition, many visual cues such as a patient's skin turning cyanotic (blue) from lack of oxygen are difficult to simulate. These effects are often represented by creative substitutes such as blue make-up and oatmeal vomit. However, in addition to making a mess, physically simulated blood gushing from a simulated wound or vomit can potentially cause short-circuits because of the electronics in a MPS.

Virtual simulations have also been used for education and training. Typically, the simulation model is instantiated via a display such as computer, PDA or cell phone screens, or stereoscopic, 3-D, holographic or panoramic displays. An intermediary device, often a mouse, joystick, or Wii™, is needed to interact with the simulation.

Virtual abstract simulations, such as transparent reality simulations of anesthesia machines and medical equipment or drug dissemination during spinal anesthesia, emphasize internal structure, functions and processes of a simulated system. Gases, fluids and substances that are usually invisible or hidden can be made visible or even color-coded and their flow and propagation can be visualized within the system. However, in a virtual simulation without the use of haptic gloves, the simulator cannot be directly touched like a physical simulation. In the virtual simulations, direct interaction using one's hands or real instruments such as laryngoscopes or a wrench is also difficult to simulate. For example, it can be difficult to simulate a direct interaction such as turning an oxygen flowmeter knob or opening a spare oxygen cylinder in the back of the anesthesia machine.

Tactile and haptic feedback are also missing from virtual abstract simulations. In addition, the resulting virtual simulation may be abstracted to the point that it is significantly different from the actual physical layout of the real system. This abstract representation can present challenges when transferring what was learned to the actual physical system. In addition, existing virtual environment systems tend to be unwieldy, bulky, and expensive.

Computer monitor-based graphics or video based simulations are easier to distribute, but can lack in-context integration. Video based simulations can provide abstract knowledge, but can be limited in the ability to connect the abstract to the physical.

Augmented reality consists of computer generated virtual objects that have been integrated into the user's experience of the real world so that the virtual objects appear real. This alignment represents one of the core technical difficulties in augmented reality, and has many applications. For example, consider a medical training simulation scenario in which users need a high degree of visual realism of the patient and haptic feedback when they touch it. A virtual patient can exhibit high visual realism, but it must be aligned or registered with a physical mannequin, which provides haptic feedback.

Accordingly, there is a need for a simulation system that addresses the shortcomings noted in existing systems.

SUMMARY

Certain exemplary embodiments of the present disclosure relate to systems and methods in which a user wears a see through augmented reality display with an integrated depth sensor, chooses three specific points on a real object by looking at them and selecting them with verbal commands, gestures, or button presses, and then the virtual object is automatically registered to the real object.

Certain embodiments include a system comprising: a physical anatomic model; an augmented reality display device; and an electronic control device. In particular embodiments, the electroinc control device comprises a computer processor in communication with the augmented reality display device. In some embodiments, the electronic control device is configured to: allow a user to select a plurality of registration points on the physical anatomic model; generate a virtual anatomic display; and register the virtual anatomic display with the physical anatomic model.

In specific embodiments, the virtual anatomic display is visible to the user through the augmented reality display device in a position registered with the physical anatomic model; and electronic control device is configured control movement of the virtual anatomic display.

In certain embodiments, the physical anatomic model comprises at least a partial representation of a person. In certain embodiments, the physical anatomic model may comprise a partial representation of a person in a particular position, including for example, lying in a supine position or in a sitting position. In particular embodiments, the physical anatomic model comprises a torso comprising a lower middle region, an upper right region and an upper left region. In some embodiments, the plurality of registration points are located on the torso of the physical anatomic model. In specific embodiments, the plurality of registration points comprise a first point designated as M, a second point designated as R and a third point designated as L. In certain embodiments, M is located in the lower middle region of the torso, R is located in the upper right region of the torso and L is located in the upper left region of the torso. In particular embodiments, the electronic control device comprises a registration algorithm to register M, R and L on the physical anatomic model with the virtual anatomic display.

In some embodiments, the registration algorithm is configured to: calculate a forward vector F by the formula $F=((R+L)/2-M)/\|((R+L)/2-M)\|$; calculate a left to right vector V2 by the formula $V2=(L-R)/\|(L-R)\|$; take a first cross product of F and V2 to obtain normal vector N; take a second cross product of F and N to obtain another normal vector S; use the vectors S,N,F in a first rotation matrix [S,N,F] or convert to a quaternion and use M as a fourth vector in a second rotation matrix [S,N,F,M] for position to form a complete coordinate frame; and multiply the complete coordinate frame with coordinates of the virtual anatomic display. In particular embodiments, there is also a vector T that represents the normal of the surface that the virtual legs will lay on. To calculate the correct bend at the hips, one can calculate the angle between N and T, e.g., a $\cos(N.T)$.

In specific embodiments, the electronic control device is a table, laptop computer or mobile phone. In certain embodiments, the movement of the virtual anatomic display comprises simulated breathing conditions. In particular embodiments, the augmented reality display device is worn as a headset with a lens and allows the user to see through the lens.

Certain embodiments, include a method of providing a simulated training environment, the method comprising: a user obtaining a system as disclosed herein (e.g. a system according to claim 1); the user selecting the plurality of registration points on the physical anatomic model and the surface upon which the physical anatomic model is positioned; the electronic control device registering the virtual anatomic display with the physical anatomic model; and the electronic control device controlling movement of the virtual anatomic display.

In particular embodiments, the user touches the physical anatomic model while viewing movement of the virtual anatomic display. In some embodiments, the physical anatomic model comprises a torso and the user selects the plurality of registration points on the torso of the physical anatomic model. In specific embodiments, the plurality of registration points are selected on a lower middle region of the torso, an upper right region of the torso and an upper left region of the torso of the physical anatomic model.

In certain embodiments, the electronic control device controls simulated breathing conditions of the virtual anatomic display. In particular embodiments, the user views the virtual anatomic display through a lens of a headset while touching the physical anatomic model. In some embodiments, the electronic control device controls movement of the virtual anatomic display to simulate an emergency medical condition. In specific embodiments, the user selects the plurality of registration points on the physical anatomic model with verbal commands. In certain embodiments, the user engages contact with the the physical anatomic model in response to movement of the virtual anatomic display.

In the following, the term "coupled" is defined as connected, although not necessarily directly, and not necessarily mechanically.

The use of the word "a" or "an" when used in conjunction with the term "comprising" in the claims and/or the specification may mean "one," but it is also consistent with the meaning of "one or more" or "at least one." The terms "about", "approximately" or "substantially" means, in general, the stated value plus or minus 5%.

The use of the term "or" in the claims is used to mean "and/or" unless explicitly indicated to refer to alternatives only or the alternative are mutually exclusive, although the disclosure supports a definition that refers to only alternatives and "and/or."

The terms "comprise" (and any form of comprise, such as "comprises" and "comprising"), "have" (and any form of have, such as "has" and "having"), "include" (and any form of include, such as "includes" and "including") and "contain" (and any form of contain, such as "contains" and "containing") are open-ended linking verbs. As a result, a method or device that "comprises," "has," "includes" or "contains" one or more steps or elements, possesses those one or more steps or elements, but is not limited to possessing only those one or more elements. Likewise, a step of a method or an element of a device that "comprises," "has," "includes" or "contains" one or more features, possesses those one or more features, but is not limited to possessing only those one or more features. Furthermore, a device or structure that is configured in a certain way is configured in at least that way, but may also be configured in ways that are not listed.

Other objects, features and advantages of the present invention will become apparent from the following detailed description. It should be understood, however, that the detailed description and the specific examples, while indicating specific embodiments of the invention, are given by way of illustration only, since various changes and modifications within the spirit and scope of the invention will be apparent to those skilled in the art from this detailed description.

BRIEF DESCRIPTION OF THE DRAWINGS

The following drawings form part of the present specification and are included to further demonstrate certain aspects of the present disclosure. The invention may be better understood by reference to one of these drawings in combination with the detailed description of specific embodiments presented herein.

The patent or application file contains at least one drawing executed in color. Copies of this patent or patent application publication with color drawing(s) will be provided by the Office upon request and payment of the necessary fee.

DETAILED DESCRIPTION OF ILLUSTRATIVE EMBODIMENTS

Exemplary embodiments of the present disclosure include an augmented reality systems configured to provide visual simulations of actions by a person under observation or treatment. For example, in certain embodiments, visual simulations of breathing conditions, limb movement or other actions of a virtual anatomic display can be registered with a physical mannequin or anatomical model and simulated in an augmented reality system. This can allow a system user to experience haptic feedback with the physical mannequin or model while simultaneously seeing simulated actions of the virtual anatomic display.

Figure 1:
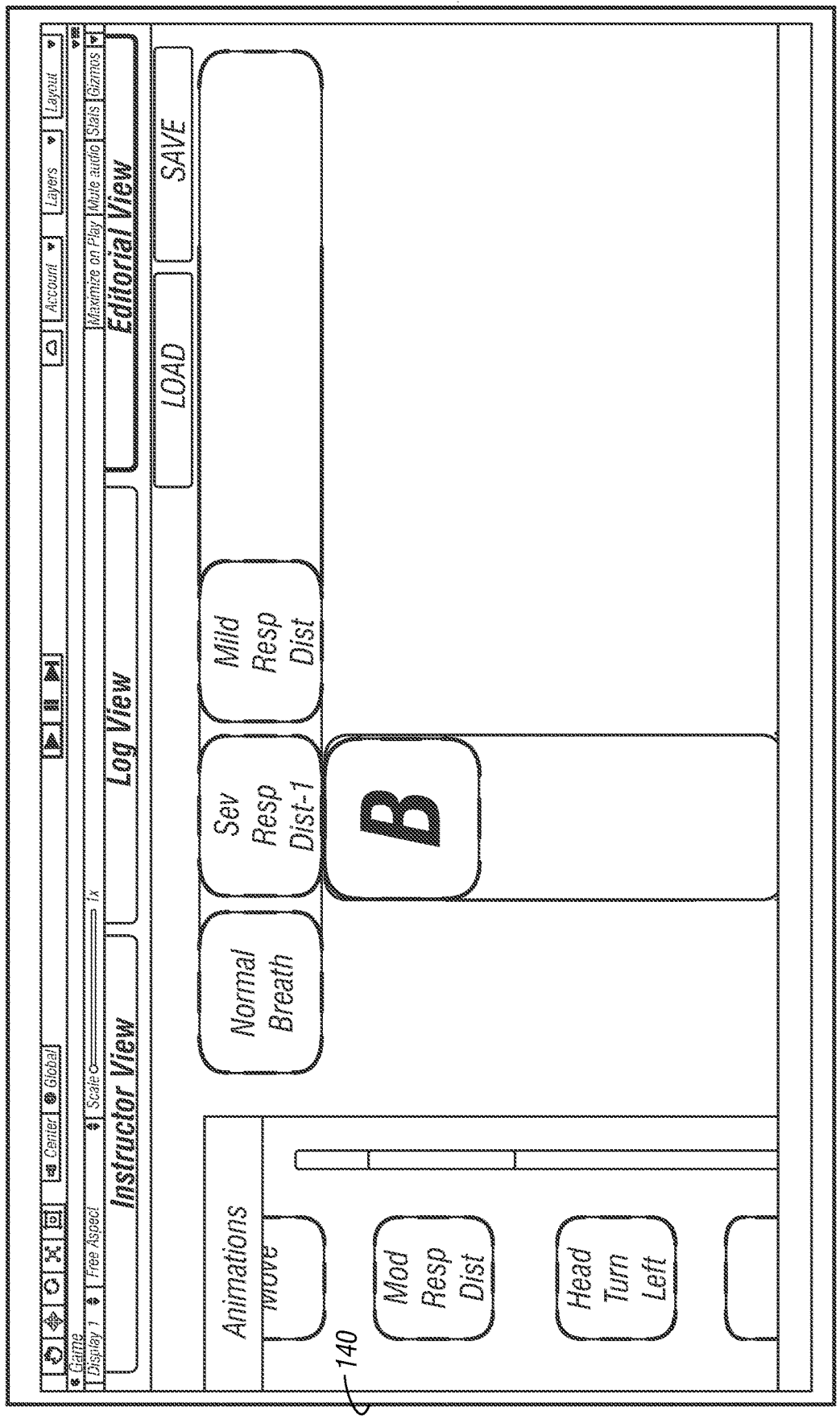
FIG. 1 shows a schematic of components of a system according to an exemplary embodiment of the present disclosure.

Referring now to FIG. 1, a system 100 comprises a physical anatomic model 120, an augmented reality display device 140 and electronic control device 160. In the embodiment shown, electronic control device 160 comprises a computer processor in communication with augmented reality display device augmented reality display device 140. In specific embodiments, electronic control device 160 may be a tablet, laptop, mobile phone, or other suitable configuration. Augmented reality display device 140 may be configured as a wearable device (e.g. a headset, goggles or eyeglasses) that allow a user to see the physical environment surrounding the user as well as a virtual display superimposed on the physical environment. In certain specific embodiments, augmented reality display device 140 may be a commercially available augmented reality display device, including for example, Microsoft HoloLens™ or other similar devices.

During operation of system 100, a user can select a plurality of registration points on physical anatomic model 120. In certain embodiments, physical anatomic model 120 may be configured as a mannequin or model of a person lying in a supine position. In particular embodiments, physical anatomic model 120 may be configured as a model of a person that can be used to train medical, emergency response or other professional personnel.

Figure 2:
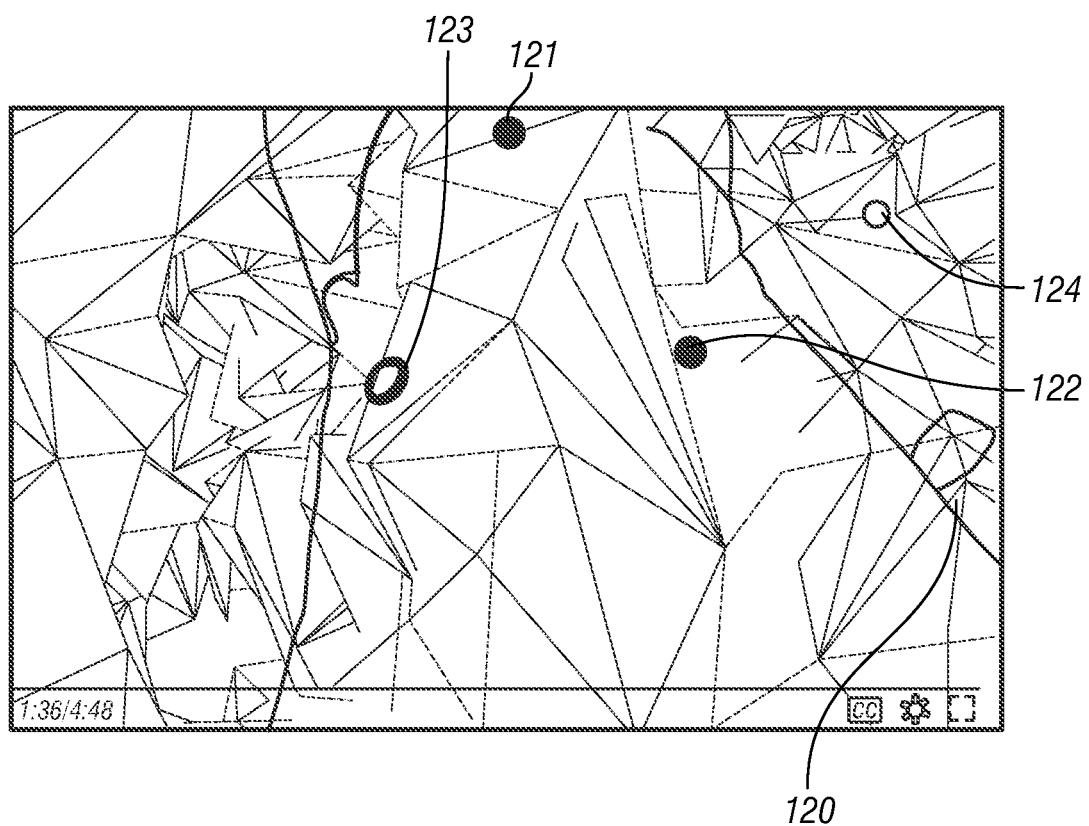
FIG. 2 shows a selection of registration points on a physical anatomic model of the embodiment of FIG. 1.

As shown in FIG. 2, the user can select a first point 121, a second point 122, and a third point 123 on the torso of physical anatomic model 120. In addition, the user can select a fourth point 124 on the surface on which physical anatomic model 120 is positioned. In the particular embodiment shown first point 121 may be selected in the lower middle region of the torso (e.g. proximal to the navel), while second point 122 is selected in the upper right region of the torso and third point 123 is selected in the upper left region of the torso (e.g. proximal to the right and left papillae, respectively). In particular embodiments, the registration points may be selected via commands through electronic control device 160, including for example, verbal commands.

Figure 3:
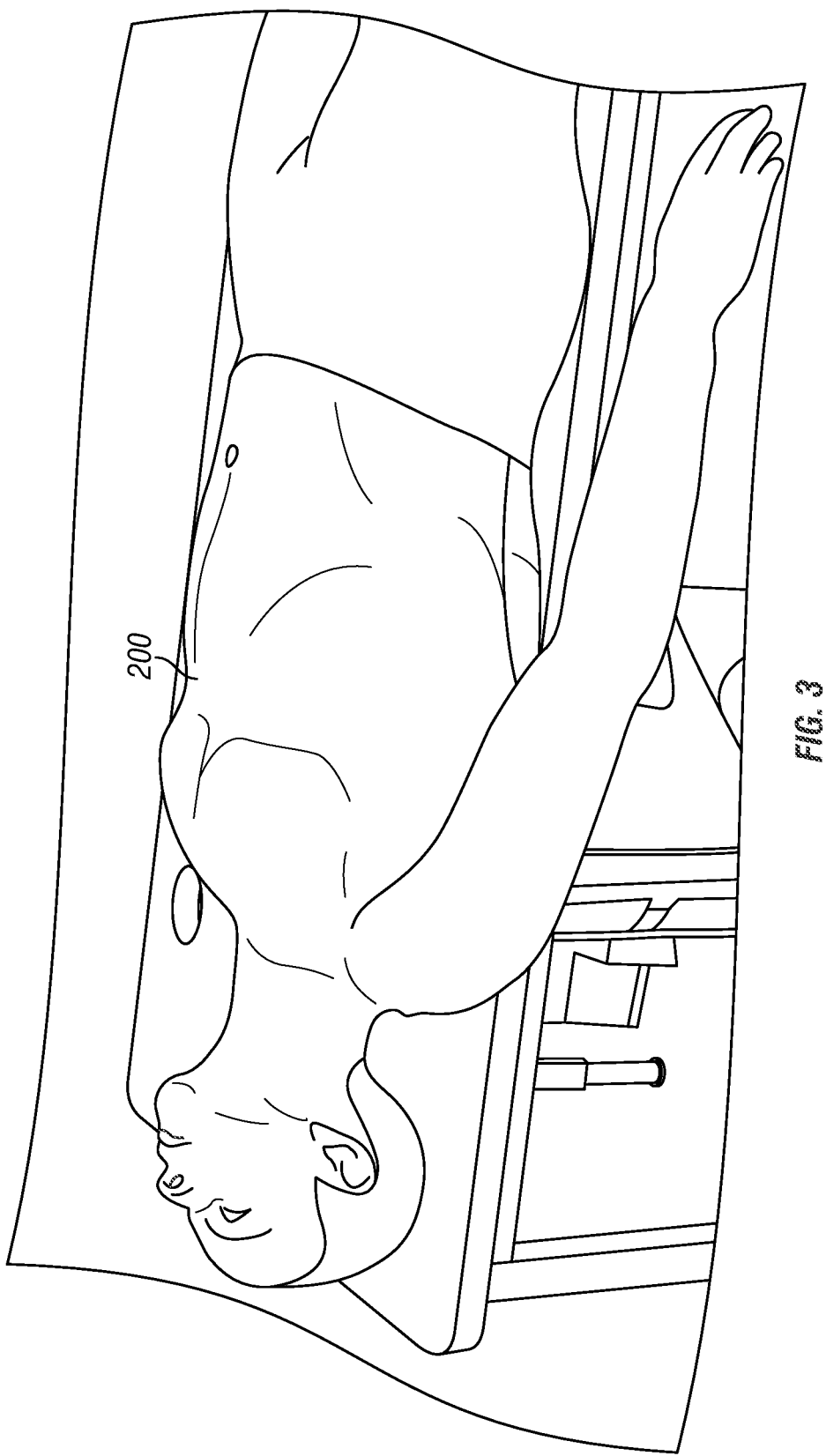
FIG. 3 shows virtual anatomic display registered with the physical anatomic model of the embodiment of FIG. 1.

After the registration points have been selected, the user can instruct system 100 to generate a virtual anatomic display 200 as shown in FIG. 3. In exemplary embodiments, virtual anatomic display 200 can be a representation of a person lying in a supine position. System 100 can register virtual anatomic display 200 with physical anatomic model 120 such that virtual anatomic display 200 is visible to the user through augmented reality display device 140. In exemplary embodiments, virtual anatomic display 200 is displayed in a position registered with physical anatomic model 120. For example, the registration points 121, 122 and 123 selected on physical anatomic model 120 correspond with similar anatomic regions of virtual anatomic display 200. Accordingly, when viewed through augmented reality display device 140, a user will see virtual anatomic display 200 superimposed over physical anatomic model 120. This can allow a user to visually see virtual anatomic display 200 while engaging with physical anatomic model 120 and receiving haptic or tactile feedback.

In exemplary embodiments, an automatic registration algorithm can be implemented by system 100 to register points 121, 122 and 123 selected on physical anatomic model 120 with virtual anatomic display 200. For example, point 121 can be designated a middle (M) point of the lower torso, point 122 designated a right (R) point of the upper torso, and point 123 designated a left (L) point of the upper torso. These nomenclature for these points corresponds to the orientation of the physical points with respect to the user when standing at the head end of physical anatomic model 120 and looking downward.

The three points correspond to the orientation of the physical points with respect to the user. Electronic control device 160 can implement software with an algorithm to register physical anatomic model 120 with virtual anatomic display 200. For example, forward vector F can be calculated by the formula $F=((R+L)/2-M)/\|((R+L)/2-M)\|$, and the left to right vector V2 calculated by the formula $V2=(L-R)/\|(L-R)\|$.

Taking a first cross product of these two vectors gives the normal N. A second cross product of F and N can then be taken to form another vector perpendicular to $N \times F=S$. The algorithm can then use these three vectors in a first rotation matrix [S,N,F] (or convert to a quaternion) and use point M as the 4th vector in a second rotation matrix [S,N,F,M] for position to form a complete coordinate frame, which is multiplied with the coordinates of virtual anatomic display 200. This results in virtual anatomic display 200 being registered to physical anatomic model 120. Lastly, the algorithm can scale along directions V2, and F so that the distances of the virtual points matches that of the physical points: $\|(L-R)\|$, $\|((R+L)/2-M)\|$, respectively.

Figure 4:
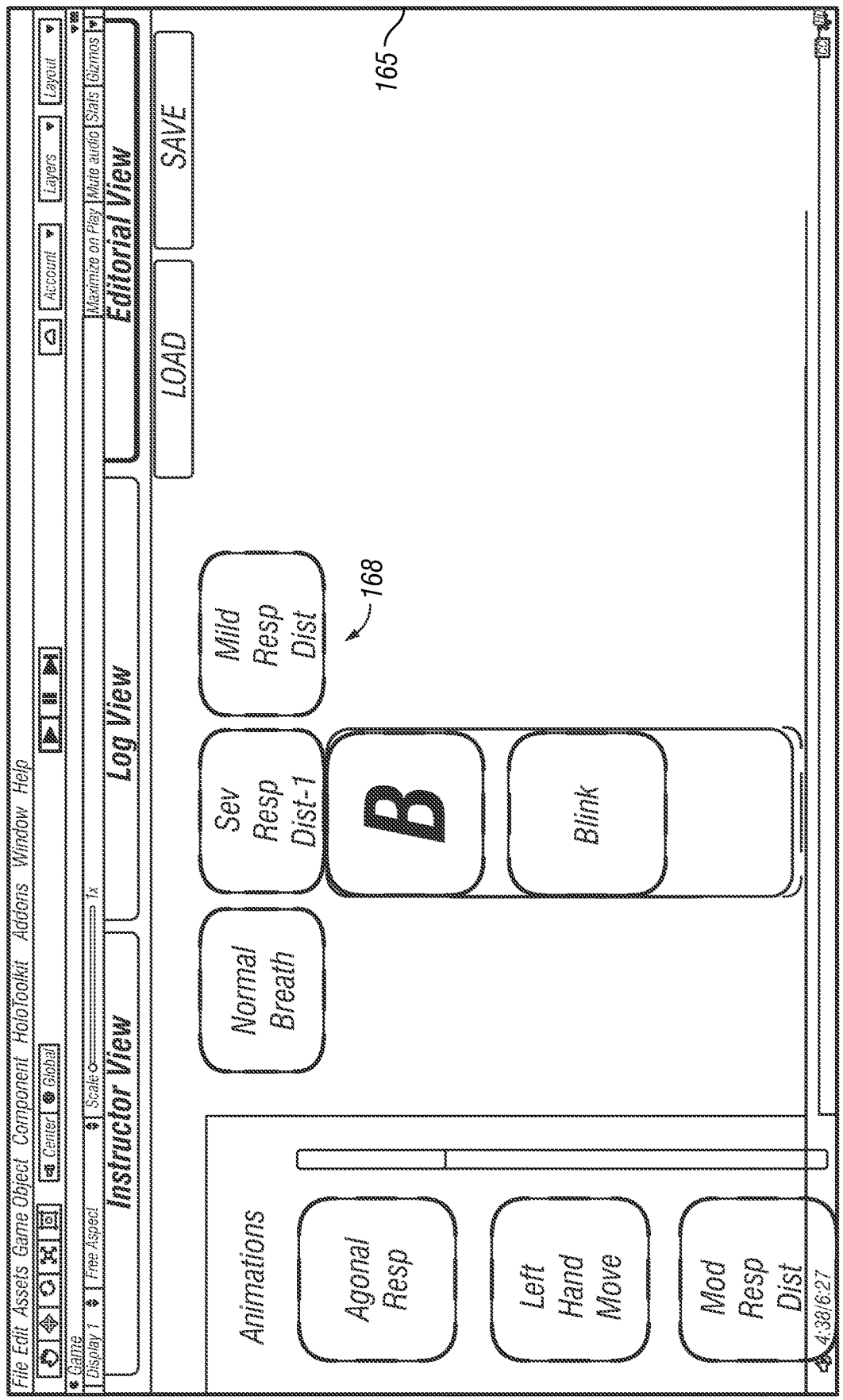
FIG. 4 shows a graphical user interface of an electronic control device of the embodiment of FIG. 1.
Figure 5:
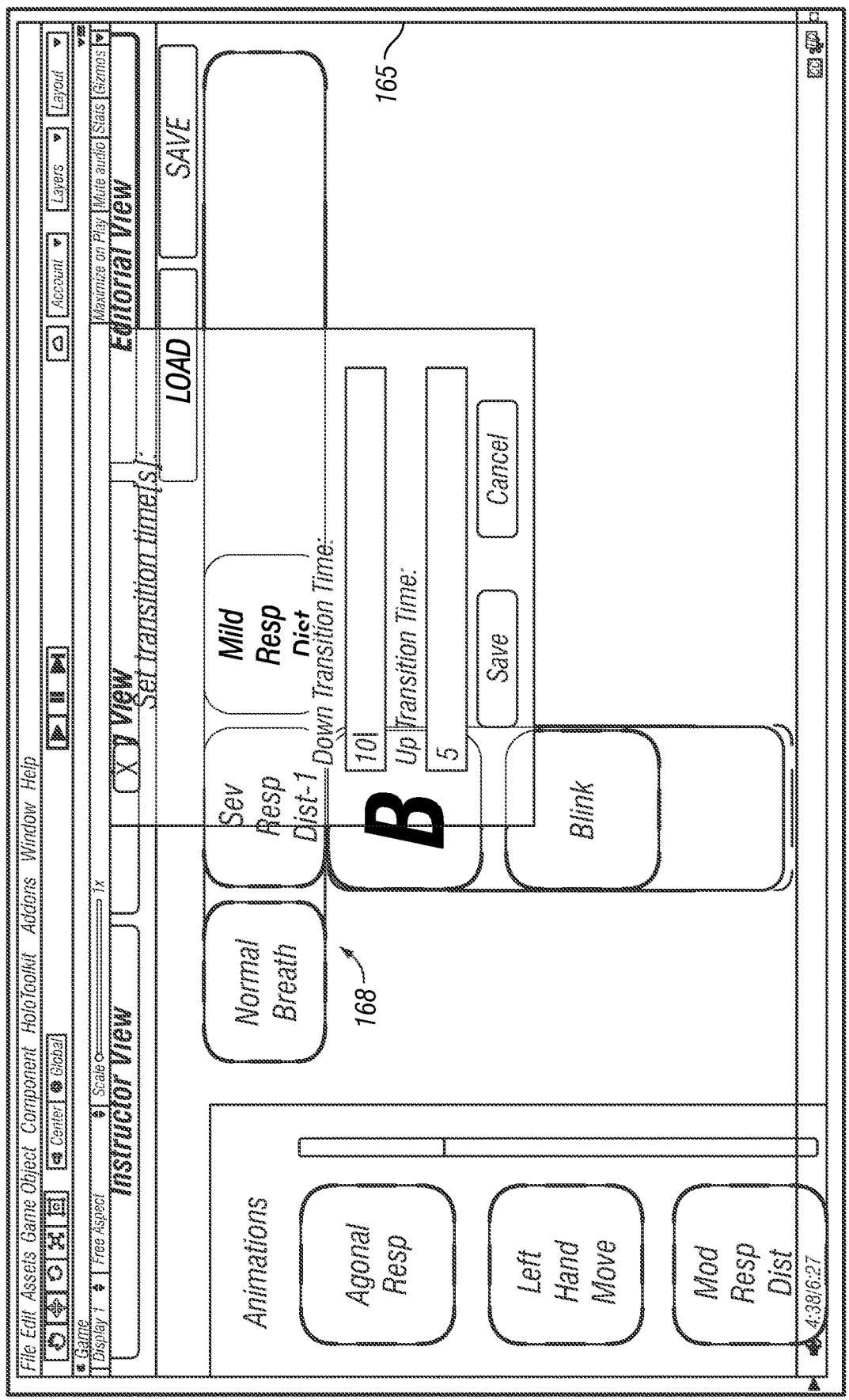
FIG. 5 shows a graphical user interface of an electronic control device of the embodiment of FIG. 1.

In exemplary embodiments, electronic control device 160 can communicate with augmented reality display device 140 (e.g. via wireless or wired communication) to control movement of virtual anatomic display 200. For example, electronic control device 160 can include a computer processor that accesses software to provide instructions to control movements of virtual anatomic display 200. Referring now to FIGS. 4-5, a graphical user interface 165 of electronic control device 160 is shown to include various animated movements 168 for virtual anatomic display 200. For example, virtual anatomic display 200 can controlled to exhibit different breathing conditions such as "Normal Breath", "Sev Resp Dist-1" (severe respiratory distress), "Mild Resp Dist" (mild respiratory distress). In certain embodiments, the rate and height of chest contractions and expansions of virtual anatomic display 200 can be increased or decreased to simulate the different breathing conditions.

In addition, graphical user interface 165 of electronic control device 160 can be used to control other movements of virtual anatomic display 200. For example, virtual anatomic display 200 can controlled to perform other movements as hand movement or blinking. It is understood that these examples are merely a few of the movements that virtual anatomic display 200 can perform.

In addition to controlling different movements, graphical user interface 165 of electronic control device 160 can be used to control the amount of time that virtual anatomic display 200 performs each movement or exhibits particular breathing condition. Referring now to FIG. 5, graphical user interface 165 can be programmed to control the number of seconds the transition times between certain conditions or movements.

During operation of system 100, the ability to combine the visual observation of virtual anatomic display 200 with the tactile and haptic feedback of physical anatomic model 120 can provide numerous benefits to a user. For example, during a training session for medical, emergency response or other professional personnel, the user can observe certain physical conditions exhibited by virtual anatomic display 200 and take appropriate action by engaging physical anatomic model 120. The ability to receive haptic feedback from physical anatomic model 120 can better prepare the user for actual emergency response or medical treatment scenarios. For example, physical anatomic model 120 can simulate the physical responses experienced by the user when administering care to a person exhibiting the conditions simulated by virtual anatomic display 200.

The ability to simulate different physical conditions with virtual anatomic display 200 can also reduce the cost and complexity of a system used to train medical, emergency response or other professional personnel. Instead of employing an animated physical model to simulate different actions and physical conditions, system 100 can use virtual anatomic display 200 to replicate such actions and movements. Accordingly, the physical model is not required to have various motors, actuators, linkages, etc. to create movement. In addition, the use of virtual anatomic display 200 provides for greater flexibility in altering parameters of the animations without having to alter the movement of a physical model. Furthermore, system 100 can be adapted to use different physical models for particular training or simulation requirements. This can provide added flexibility in tailoring a simulation to those of a particular user.

It is understood that the above-described devices and methods are merely non-limiting examples of embodiments of the devices and methods disclosed herein.

All of the apparatus, devices, systems and/or methods disclosed and claimed herein can be made and executed without undue experimentation in light of the present disclosure. While the devices, systems and methods of this invention have been described in terms of particular embodiments, it will be apparent to those of skill in the art that variations may be applied to the devices, systems and/or methods in the steps or in the sequence of steps of the method described herein without departing from the concept, spirit and scope of the invention. All such similar substitutes and modifications apparent to those skilled in the art are deemed to be within the spirit, scope and concept of the invention as defined by the appended claims.

REFERENCES

The contents of the following references are incorporated by reference herein:
U.S. Pat. No. 8,469,713
U.S. Pat. No. 8,605,133
U.S. Pat. No. 8,662,892
U.S. Pat. No. 8,990,682
U.S. Pat. No. 9,053,641
U.S. Pat. No. 9,081,177
U.S. Pat. No. 9,142,144
U.S. Pat. No. 9,251,721
U.S. Pat. No. 9,318,032
U.S. Pat. No. 9,341,849
U.S. Patent Publication 2008/0020361
U.S. Patent Publication 2010/0157018
U.S. Patent Publication 2010/0055657
U.S. Patent Publication 2010/0159434
U.S. Patent Publication 2011/0084983
U.S. Patent Publication 2011/0119317
U.S. Patent Publication 2012/0102231
U.S. Patent Publication 2012/0038739
U.S. Patent Publication 2012/0045742
U.S. Patent Publication 2012/0001937
U.S. Patent Publication 2012/0102439
U.S. Patent Publication 2012/0313968
U.S. Patent Publication 2013/0095452
U.S. Patent Publication 2014/0240349
U.S. Patent Publication 2015/0015582
U.S. Patent Publication 2015/0356890
PCT Patent Publication WO2012106706
PCT Patent Publication WO2012106706
PCT Patent Publication WO2015027286
EP2587792A1
EP2587792A4
DE102014011163
DE102014224851

The invention claimed is:

1. A system comprising:
a physical anatomic model;
an augmented reality display device; and
an electronic control device comprising a computer processor in communication with the augmented reality display device, wherein:
the electronic control device is configured to:
 allow a user to select a plurality of registration points on the physical anatomic model;
 generate a virtual anatomic display; and
 register the virtual anatomic display with the physical anatomic model, wherein the virtual anatomic display is visible to the user through the augmented reality display device in a position registered with the physical anatomic model; and
control movement of the virtual anatomic display; and
wherein:
 the physical anatomic model comprises at least a partial representation of a person lying in a supine position;
 the physical anatomic model comprises a torso comprising a lower middle region, an upper right region, and an upper left region;
 the plurality of registration points are located on the torso of the physical anatomic model;
 the plurality of registration points comprise a first point designated as M, a second point designated as R, and a third point designated as L;
 M is located in the lower middle region of the torso, R is located in the upper right region of the torso, and L is located in the upper left region of the torso;

the electronic control device comprises a registration algorithm to register M, R, and L on the physical anatomic model with the virtual anatomic display; and the registration algorithm is configured to:
calculate a forward vector F by the formula $F=((R+L)/2-M)/\|((R+L)/2-M)\|$;
calculate a left to right vector V2 by the formula $V2=(L-R)/\|(L-R)\|$;
take a first cross product of F and V2 to obtain normal vector N;
take a second cross product of F and N to obtain another normal vector S;
use the vectors S,N,F in a first rotation matrix [S,N,F] or convert to a quaternion and use M as a fourth vector in a second rotation matrix [S,N,F,M] for position to form a complete coordinate frame; and
multiply the complete coordinate frame with coordinates of the virtual anatomic display.

2. The system of claim 1, wherein the electronic control device is a tablet, laptop computer, or mobile phone.

3. The system of claim 1, wherein the movement of the virtual anatomic display comprises simulated breathing conditions.

4. The system of claim 1, wherein the augmented reality display device is worn as a headset with a lens and allows the user to see through the lens.

5. A method of providing a simulated training environment, the method comprising:
selecting, by a user, a plurality of registration points on a physical anatomic model and a surface upon which the physical anatomic model is positioned;
registering a virtual anatomic display with the physical anatomic model;
controlling movement of the virtual anatomic display, wherein:
the physical anatomic model comprises at least a partial representation of a person lying in a supine position;
the physical anatomic model comprises a torso comprising a lower middle region, an upper right region, and an upper left region;
the plurality of registration points are located on the torso of the physical anatomic model;
the plurality of registration points comprise a first point designated as M, a second point designated as R, and a third point designated as L; and
M is located in the lower middle region of the torso, R is located in the upper right region of the torso, and L is located in the upper left region of the torso; and
registering M, R, and L on the physical anatomic model with the virtual anatomic display by:
calculating a forward vector F by the formula $F=((R+L)/2-M)/\|((R+L)/2-M)\|$;
calculating a left to right vector V2 by the formula $V2=(L-R)/\|(L-R)\|$;
taking a first cross product of F and V2 to obtain normal vector N;
taking a second cross product of F and N to obtain another normal vector S;
using the vectors S,N,F in a first rotation matrix [S,N,F] or converting to a quaternion and using M as a fourth vector in a second rotation matrix [S,N,F,M] for position to form a complete coordinate frame; and
multiplying the complete coordinate frame with coordinates of the virtual anatomic display.

6. The method of claim 5, wherein the user touches the physical anatomic model while viewing the movement of the virtual anatomic display.

7. The method of claim 5, further comprising controlling simulated breathing conditions of the virtual anatomic display.

8. The method of claim 5, wherein the user views the virtual anatomic display through a lens of a headset while touching the physical anatomic model.

9. The method of claim 5, further comprising controlling the movement of the virtual anatomic display to simulate an emergency medical condition.

10. The method of claim 5, wherein the user selects the plurality of registration points on the physical anatomic model with verbal commands.

11. The method of claim 5, wherein the user engages contact with the physical anatomic model in response to the movement of the virtual anatomic display.

* * * * *